United States Patent
Klauber

(10) Patent No.: US 7,121,228 B1
(45) Date of Patent: Oct. 17, 2006

(54) ANIMAL WASTE DISPOSING ASSEMBLY

(76) Inventor: Richard M. Klauber, 7090 N. Bengston Ave., Fresno, CA (US) 93711

( * ) Notice: Subject to any disclaimer, the term of this patent is extended or adjusted under 35 U.S.C. 154(b) by 137 days.

(21) Appl. No.: 10/899,403

(22) Filed: Jul. 27, 2004

(51) Int. Cl.
*A01K 1/01* (2006.01)
*E03C 1/26* (2006.01)

(52) U.S. Cl. .................................... 119/161; 4/288
(58) Field of Classification Search ............ 119/161, 119/867; 4/288
See application file for complete search history.

(56) References Cited

U.S. PATENT DOCUMENTS

| | | | |
|---|---|---|---|
| 788,721 A | 5/1905 | Johnson | |
| 1,769,061 A * | 7/1930 | Hitchcock | 222/3 |
| 1,962,978 A * | 6/1934 | Baldare | 137/362 |
| 3,314,085 A * | 4/1967 | Minella | 4/689 |
| 3,315,280 A * | 4/1967 | Krenn | 4/255.01 |
| 3,564,619 A * | 2/1971 | Magathan | 4/319 |
| 3,835,812 A * | 9/1974 | Edwards | 119/161 |
| 3,858,612 A * | 1/1975 | Van Steenburg | 138/89 |
| 3,881,201 A * | 5/1975 | Richards | 4/286 |
| 3,964,437 A | 6/1976 | Brown | |
| 4,092,745 A * | 6/1978 | Oropallo | 4/288 |
| 4,117,555 A * | 10/1978 | Dennis | 119/163 |
| 4,164,796 A * | 8/1979 | Sakow | 4/288 |
| 4,228,554 A * | 10/1980 | Tumminaro | 119/161 |
| 4,326,481 A * | 4/1982 | Gruss | 119/171 |
| 4,476,879 A * | 10/1984 | Jackson | 600/573 |
| 4,505,814 A * | 3/1985 | Marshall | 210/166 |
| 4,562,602 A * | 1/1986 | Cuschera | 4/288 |
| 4,694,513 A * | 9/1987 | Kiziah | 4/288 |
| 4,730,854 A * | 3/1988 | Cuschera | 285/42 |
| 4,827,539 A * | 5/1989 | Kiziah | 4/252.4 |
| 4,847,923 A * | 7/1989 | Huang | 4/255.03 |
| 4,883,590 A * | 11/1989 | Papp | 210/164 |
| 4,975,989 A | 12/1990 | Sutton | |
| 5,070,820 A * | 12/1991 | Gorman | 119/161 |
| 5,115,554 A | 5/1992 | Fell, Sr. | |
| 5,209,257 A | 5/1993 | Baker, Jr. | |
| 5,372,715 A * | 12/1994 | Maggard et al. | 210/165 |
| 5,402,835 A | 4/1995 | Middleton | |
| 5,494,001 A * | 2/1996 | Leibowitz | 119/163 |
| D377,031 S | 12/1996 | Didier | |
| 5,722,791 A * | 3/1998 | Dallmer | 405/52 |
| D413,377 S | 8/1999 | Pauly | |
| 6,067,668 A * | 5/2000 | Rudd | 4/255.11 |
| 6,168,208 B1 * | 1/2001 | Thaler | 285/42 |
| 6,263,834 B1 * | 7/2001 | Igual De Valles | 119/166 |
| 6,290,279 B1 | 9/2001 | Haight et al. | |
| 6,590,146 B1 * | 7/2003 | Mrsny | 84/420 |
| D482,650 S * | 11/2003 | Ludwick | D12/400 |
| 6,640,358 B1 * | 11/2003 | Ball | 4/679 |
| 6,792,628 B1 * | 9/2004 | Humphrey | 4/661 |

* cited by examiner

*Primary Examiner*—Yvonne R. Abbott

(57) ABSTRACT

An animal waste disposing assembly includes a base that has a top side, a bottom side and a peripheral edge extending between the top and bottom sides. The base has a threaded opening extending therethrough. A cylindrically shaped post is attached to and extends away from the bottom side. The post has an aperture extending therethrough that is aligned with the opening. The post has an outer threaded surface adapted for engaging a sewer line. A cylindrically shaped cap has a lower end, an upper end and a perimeter wall. The perimeter wall is threaded and the cap has a diameter generally equal to a diameter of the opening. The lower end may be removably extended into and threadably coupled to the opening. A peripheral lip is attached to and extends upwardly from the base. Feces may be positioned in the opening and ultimately the sewer line.

14 Claims, 3 Drawing Sheets

ANIMAL WASTE DISPOSING ASSEMBLY

BACKGROUND OF THE INVENTION

1. Field of the Invention

The present invention relates to feces disposing devices and more particularly pertains to a new feces disposing device for disposing of animal feces from a yard.

2. Description of the Prior Art

The use of feces disposing devices is known in the prior art. U.S. Pat. No. 5,070,820 describes a funnel device for attachment to a drain pipe for carrying away feces. Another type of feces disposing device is U.S. Pat. No. 4,975,989 having a generally toilet-bowl shaped construction which includes an outer housing. The feces is dropped through a chute into the toilet-bowl and the toilet bowl may then be flushed to remove the animal feces.

While these devices fulfill their respective, particular objectives and requirements, the need remains for a device that is better designed to be attached to a sewer line which extends upwardly from a ground surface so that the device may be placed as flush as possible with the ground surface. This configuration will allow a person to place the device adjacent to a dwelling without the device taking away from the aesthetics of the dwelling. This will also allow the device to be better hidden, such as in a garden while still providing a convenient location to dispose of pet feces which would otherwise needed to be discarded into a trash bin.

SUMMARY OF THE INVENTION

The present invention meets the needs presented above by generally comprising a base that has a top side, a bottom side and a peripheral edge extending between the top and bottom sides. The base has a threaded opening extending therethrough. A cylindrically shaped post is attached to and extends away from the bottom side. The post has an aperture extending therethrough that is aligned with the opening in the base. The post has an outer threaded surface adapted for being removably positioned within and engaging a sewer line. A cylindrically shaped cap has a lower end, an upper end and a perimeter wall extending between the upper and lower ends. The perimeter wall is threaded and the cap has a diameter generally equal to a diameter of the opening. The lower end may be removably extended into and threadably coupled to the threaded surface of the opening. A peripheral lip is attached to and extends upwardly from the top side of the base. Feces may be positioned in the opening such that the feces falls into the sewer line.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
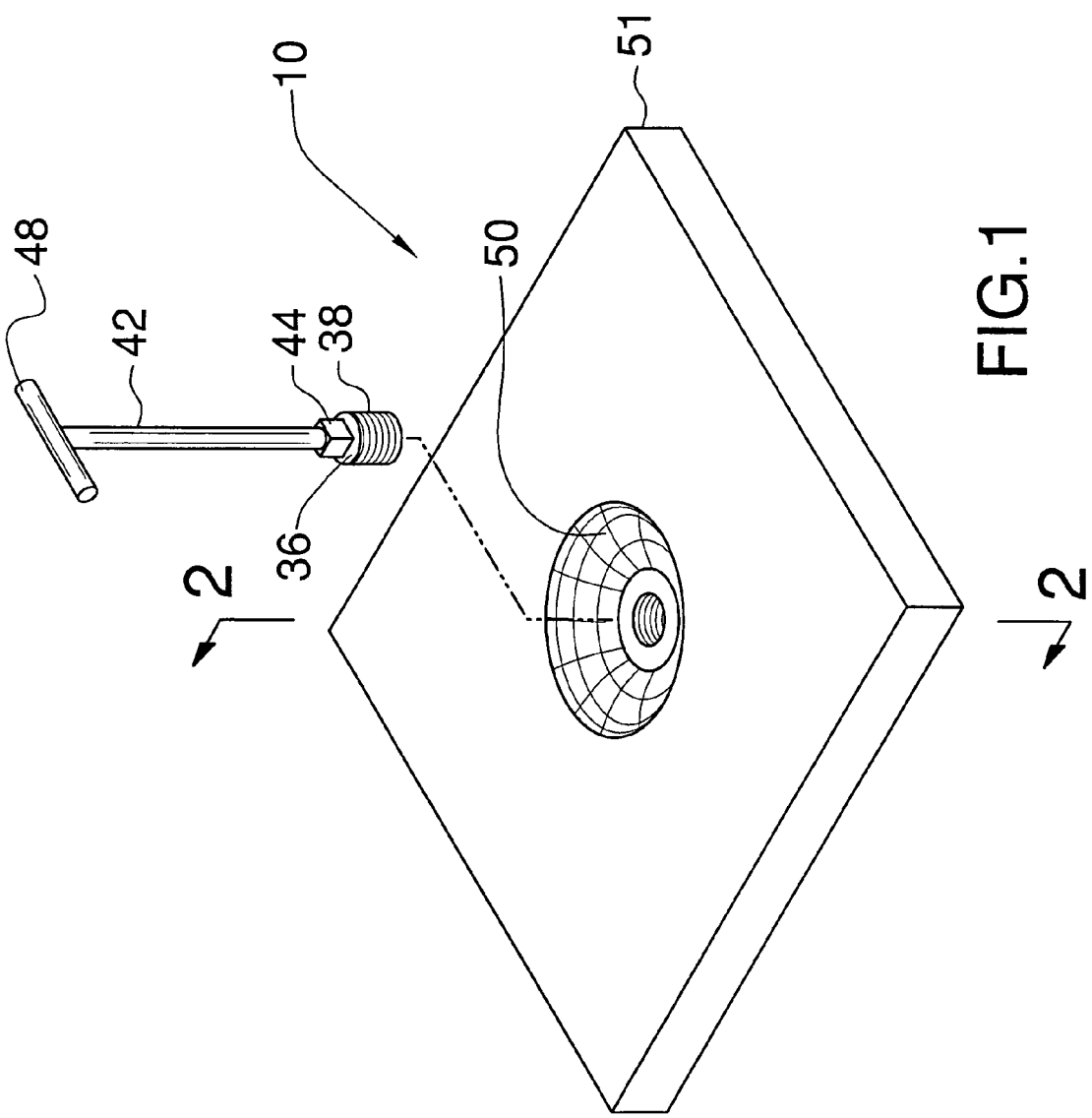
FIG. 1 is a perspective view of a animal waste disposing assembly according to the present invention.
Figure 2:
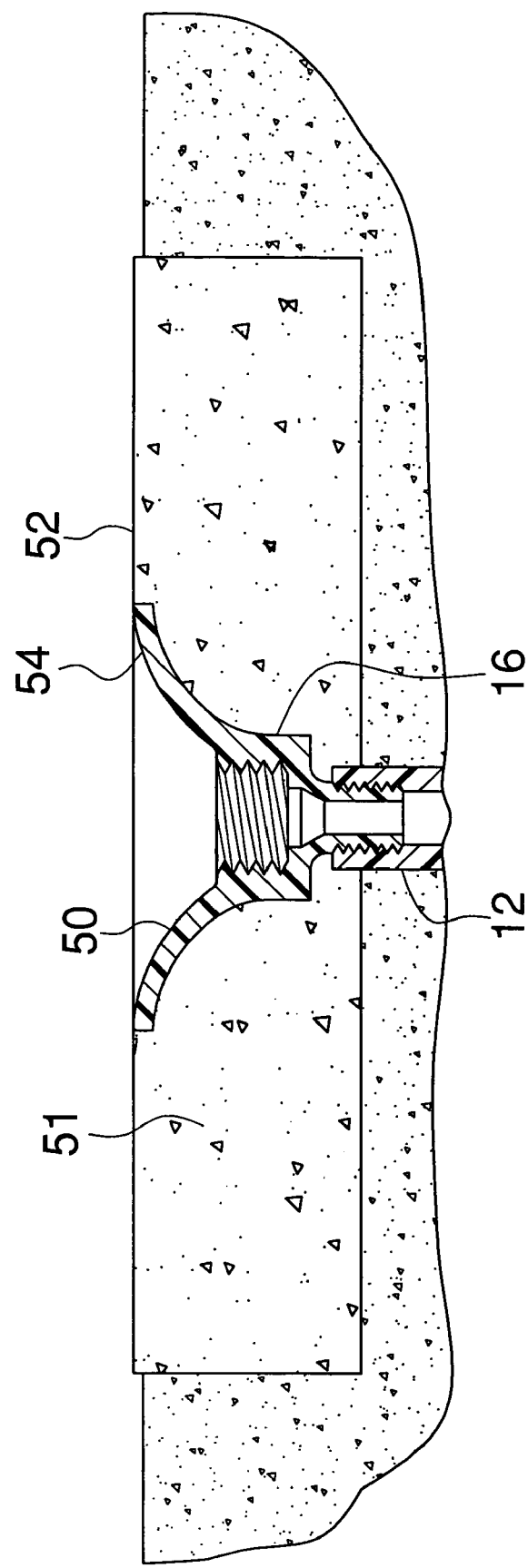
FIG. 2 is a cross-sectional view taken along line 2—2 of FIG. 1 of the present invention.
Figure 3:
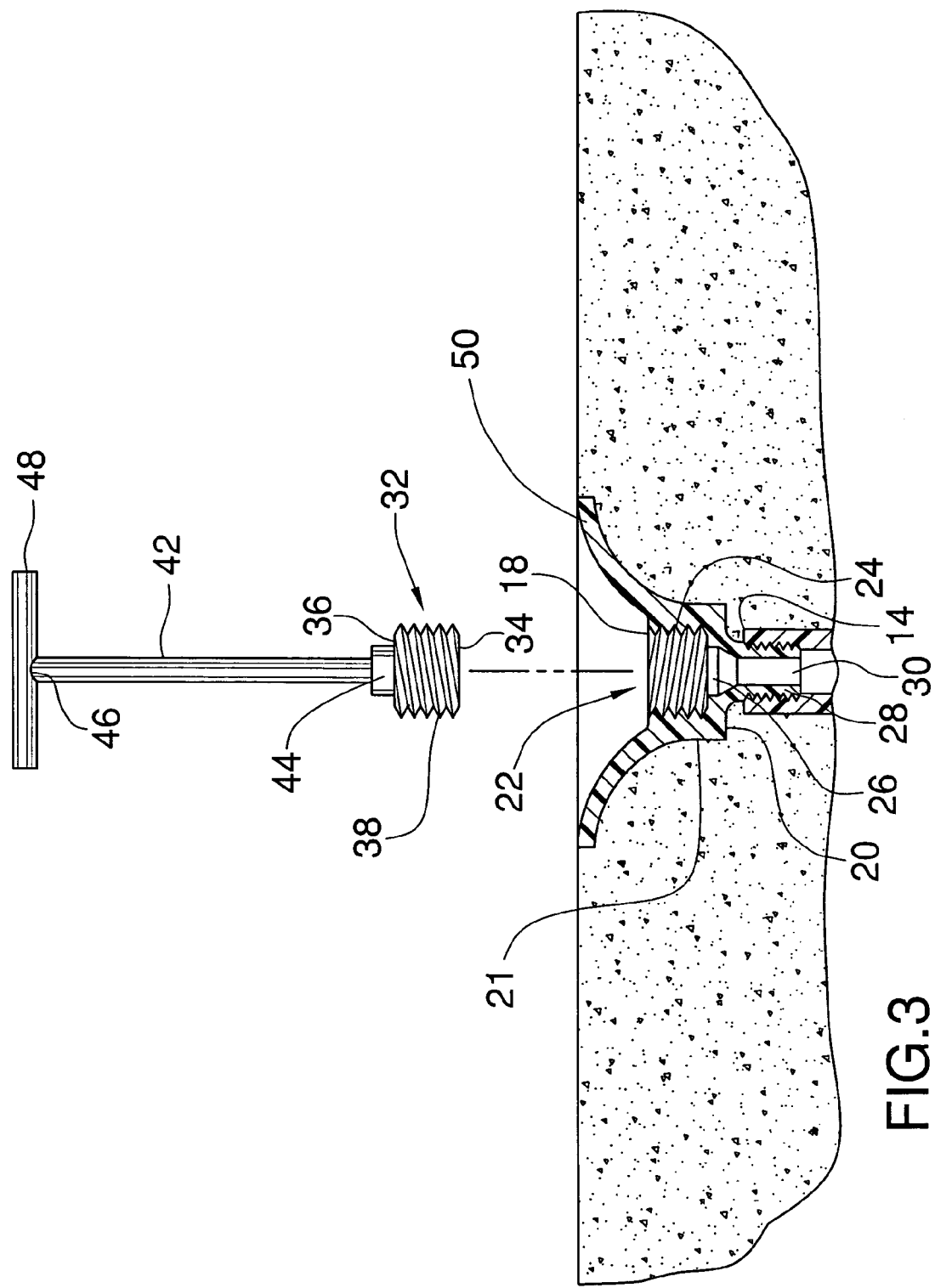
FIG. 3 is a cross-sectional view of the present invention.

With reference now to the drawings, and in particular to FIGS. 1 through 3 thereof, a new feces disposing device embodying the principles and concepts of the present invention and generally designated by the reference numeral 10 will be described.

As best illustrated in FIGS. 1 through 3, the animal waste disposing assembly 10 generally comprises an assembly for depositing feces into a sewer line 12. The sewer line 12 has an upper end 14 having an internal threaded surface. The sewer line 12 extends upwardly toward a ground surface. The sewer line 12 is fluidly coupled to the sewer system of a building, such as a house. The sewer line 12 is preferably located in the backyard of the house where a dog would typically defecate. The assembly 10 includes a base 16 that has a top side 18, a bottom side 20 and a peripheral edge 21 extending between the top 18 and bottom 20 sides. The base 16 has an opening 22 therein extending through the top 18 bottom 20 sides. The opening 22 includes an upper portion 24 and a lower portion 26. The upper portion 24 has a threaded surface and the lower portion 26 has a smaller diameter than the upper portion 24. The lower portion 26 tapers inward from the upper portion 24 to the bottom side 20. The upper portion 24 has a diameter generally equal to about 4 inches.

A cylindrically shaped post 28 is attached to and extends away from the bottom side 20. The post 28 has an aperture 30 extending therethrough. The aperture 30 is aligned with the opening 22 in the base 16. The post 28 has an outer threaded surface adapted for being removably positioned within and engaging the sewer line 12. The post 28 has a diameter generally equal to about 3 inches.

A cylindrically shaped cap 32 has a lower end 34, an upper end 36 and a perimeter wall 38 extending between the upper 36 and lower 34 ends. The perimeter wall 38 is threaded and the cap 32 has a diameter generally equal to a diameter of the upper portion 36. The lower end 34 may be removably extended into and threadably coupled to the threaded surface of the upper portion 24 to define a closed position.

A rod 42 has a first end 44 and a second end 46. The first end 42 of the rod 42 is attached to the upper end 36 of the cap 32 so that the rod 42 extends upwardly therefrom. A handle 48 is attached to the second end 46 of the rod 42. The rod 42 aids in the removal and insertion of the cap 32 with respect to the upper portion 36.

A peripheral lip 50 is attached to and extends upwardly from the top side 18 of the base 16. The lip 50 flares outwardly from the base so that the lip 50 has an inverted frusto-conical shape. The lip 50 is preferably arcuate from an upper edge 54 to the base 16.

Optionally, concrete 51 may be poured around the lip 50, and base 16, so that that the concrete 51 abuts the lip 50. Preferably, a top surface 52 of the concrete 51 is level with the upper edge 54 of the lip 50. Additionally, the concrete 51 may have a concave depression therein leading to the upper edge 54 of the lip 50 so that a bowl is formed which drains into the lip 50. The concrete 51 stabilizes the assembly 10 and provides a place for potted plants or other aesthetic camouflage to be positioned around the lip 50.

In use, the cap 32 is removed from the opening 22 and dog feces is placed into the opening 22 so that the feces falls into the sewer line 12. This may be aided with water being poured into the opening 22. The water also cleans the lip 50 and the opening 22. Once the feces as been discarded, the cap 32 is replaced in the opening. The lip 50 aids in causing a vortex action for pulling the feces downward.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal feces depositing device for removing feces into a sewer line, the sewer line having an upper end having an internal threaded surface, said device comprising:
   a base being positioned on a ground surface, said base being positioned outside of an enclosure and being substantially exposed to ambient weather, said base having a top side, a bottom side and a peripheral edge extending between said top and bottom sides, said top side being substantially planar, said base having an opening extending therethrough, said opening being threaded;
   a cylindrically shaped post being attached to and extending away from said bottom side, said post having an aperture extending therethrough, said aperture being aligned with said opening in said base, said post having an outer threaded surface adapted for being removably positioned within and engaging the sewer line;
   a cylindrically shaped cap having a lower end, an upper end and a perimeter wall extending between said upper and lower ends, said perimeter wall being threaded, said cap having a diameter generally equal to a diameter of said opening, wherein said lower end may be removably extended into and threadably coupled to said threaded surface of said opening;
   a peripheral lip being attached to and extending upwardly from said top side of said base; and
   wherein feces may be positioned in said opening such that said feces falls into the sewer line.

2. The device according to claim 1, wherein said opening includes an upper portion and a lower portion, said lower portion having a smaller diameter than said upper portion, said lower portion tapering inward from said upper portion to said bottom side.

3. The device according to claim 2, wherein said upper portion has a diameter generally equal to 4 inches.

4. The device according to claim 1, wherein said post has a diameter generally equal to 3 inches.

5. The device according to claim 1, further including a rod having a first end and a second end, said first end of said rod being attached to said upper end of said cap, a handle being attached to said second end of said rod.

6. The device according to claim 1, wherein said lip flares outwardly from said base such that said lip has an inverted frusto-conical shape.

7. An animal feces depositing device for removing feces into a sewer line, the sewer line having an upper end having an internal threaded surface, said device comprising:
   a base being positioned on a ground surface, said base being positioned outside of an enclosure and being substantially exposed to ambient weather, said base having a top side, a bottom side and a peripheral edge extending between said top and bottom sides, said base having an opening therein extending through said top and bottom sides, said opening including an upper portion and a lower portion, said upper portion having a threaded surface, said lower portion having a smaller diameter than said upper portion, said lower portion tapering inward from said upper portion to said bottom side, said upper portion having a diameter generally equal to 4 inches;
   a cylindrically shaped post being attached to and extending away from said bottom side, said post having an aperture extending therethrough, said aperture being aligned with said opening in said base, said post having an outer threaded surface adapted for being removably positioned within and engaging the sewer line, said post having a diameter generally equal to 3 inches;
   a cylindrically shaped cap having a lower end, an upper end and a perimeter wall extending between said upper and lower ends, said perimeter wall being threaded, said cap having a diameter generally equal to a diameter of said upper portion, wherein said lower end may be removably extended into and threadably coupled to said threaded surface of said upper portion, a rod having a first end and a second end, said first end of said rod being attached to said upper end of said cap, a handle being attached to said second end of said rod;
   a peripheral lip being attached to and extending upwardly from said top side of said base, said lip flaring outwardly from said base such that said lip has an inverted frusto-conical shape; and
   wherein feces may be positioned in said opening such that said feces falls into the sewer line.

8. A method of disposing of animal waste comprising the steps of:
   providing a sewer line having an upper end having an internal threaded surface;
   providing a base being positioned on a ground surface, said base being positioned outside of an enclosure and being substantially exposed to ambient weather, said base having a top side, a bottom side and a peripheral edge extending between said top and bottom sides, said base having an opening extending therethrough, said opening being threaded;
   providing a cylindrically shaped post being attached to and extending away from said bottom side, said post having an aperture extending therethrough, said aperture being aligned with said opening in said base, said post having an outer threaded surface adapted for being removably positioned within and engaging the sewer line;
   providing a cylindrically shaped cap having a lower end, an upper end and a perimeter wall extending between said upper and lower ends, said perimeter wall being threaded, said cap having a diameter generally equal to a diameter of said opening, wherein said lower end may be removably extended into and threadably coupled to said threaded surface of said opening;

providing a peripheral lip being attached to and extending upwardly from said top side of said base;

removing said cap from said upper portion;

placing feces into said opening;

running water into to opening until said feces enters the sewer line; and repositioning said cap into said opening.

9. The method according to claim 8, wherein said opening includes an upper portion and a lower portion, said lower portion having a smaller diameter than said upper portion, said lower portion tapering inward from said upper portion to said bottom side.

10. The method according to claim 9, wherein said upper portion has a diameter generally equal to 4 inches.

11. The method according to claim 10, wherein said post has a diameter generally equal to 3 inches.

12. The method according to claim 8, further providing a rod having a first end and a second end, said first end being attached to said upper end of said cap, a handle being attached to said second end of said rod.

13. The method according to claim 8, wherein said lip flares outwardly from said base such that said lip has an inverted frusto-conical shape.

14. The method according to claim 8, further including the step of surrounding said lip with concrete such that said concrete abuts said lip.

\* \* \* \* \*